United States Patent Office 3,517,747
Patented June 30, 1970

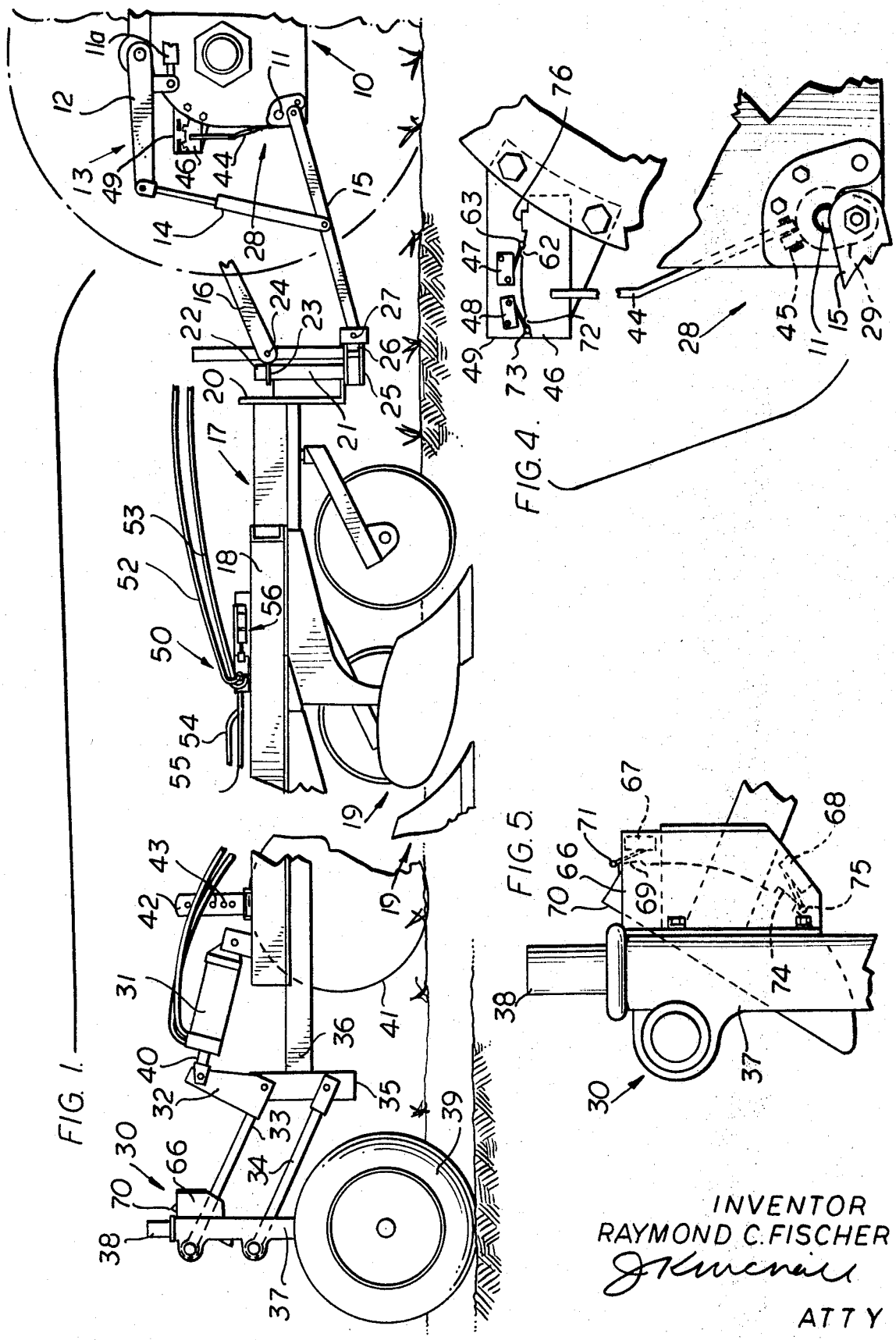

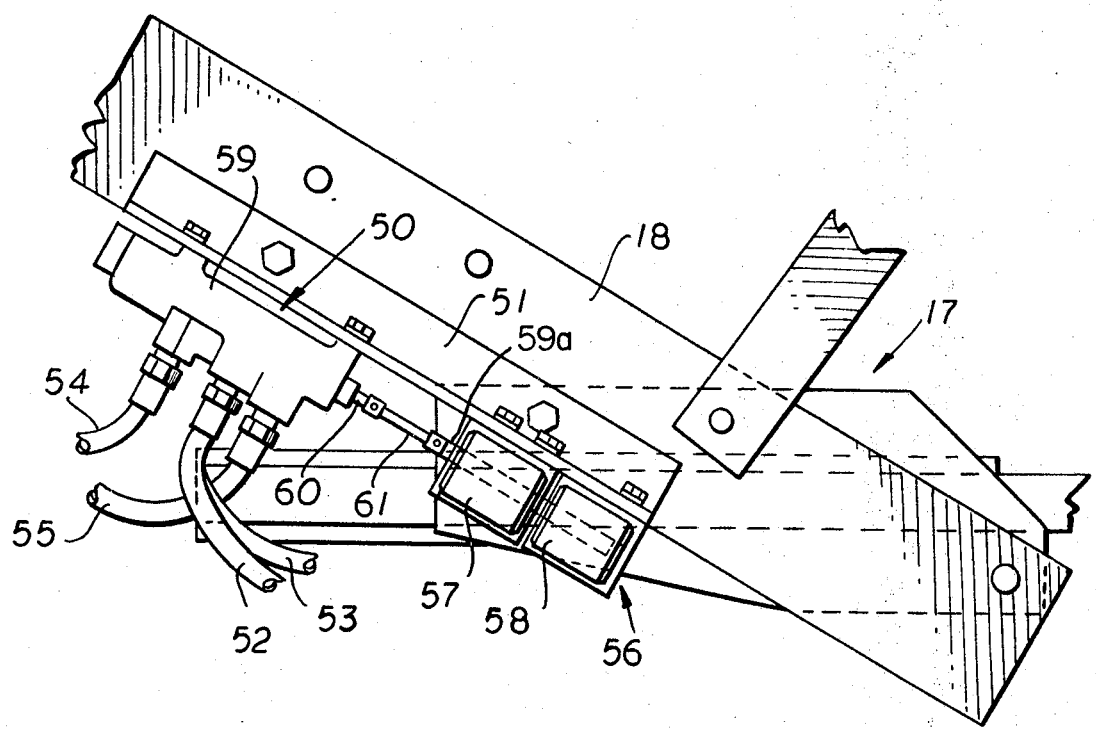
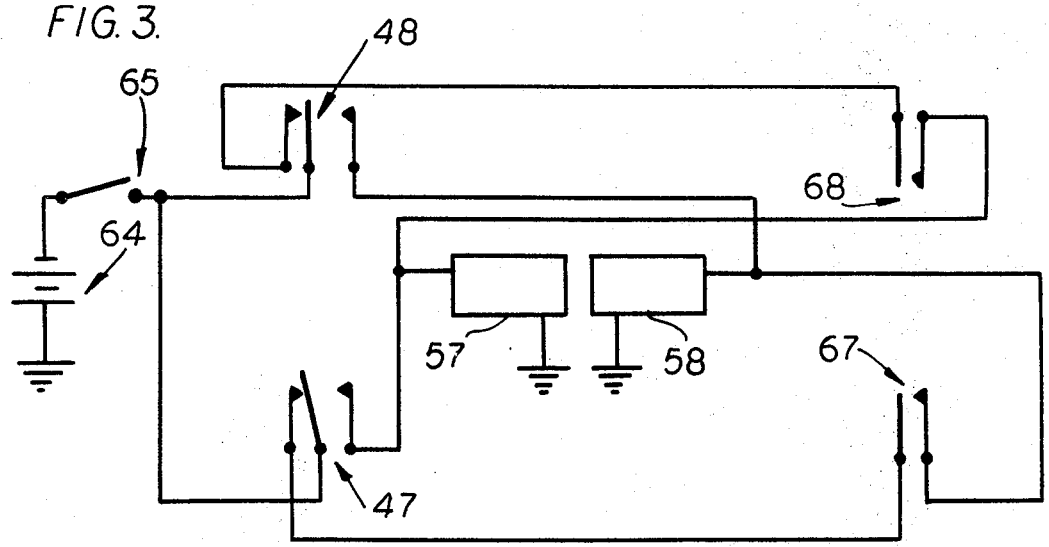

3,517,747
AUTOMATIC CONTROL MEANS FOR IMPLEMENT
Raymond C. Fischer, Hinsdale, Ill., assignor to International Harvester Company, Chicago, Ill., a corporation of Delaware
Filed Aug. 21, 1967, Ser. No. 661,874
Int. Cl. A01b *63/112, 63/16*
U.S. Cl. 172—7                                            9 Claims

ABSTRACT OF THE DISCLOSURE

A plow carrying a rear wheel raised and lowered by a cylinder on the plow frame is connected to a tractor through a movable draft responsive member which is connected to hydraulic valve means on the tractor to raise the front end of the implement when high draft resistance is encountered. In order that the rear end of the implement will rise when the front end rises, a control member is connected to the draft responsive member to move with it and is electrically connected to the valve means to also actuate the cylinder connected to the rear wheels to raise the rear of the plow.

---

This invention relates to agricultural implements and particularly plows. More specifically, the invention concerns automatic levelling means for a plow of the semi-mounted type having a rear supporting wheel.

An object of the invention is the provision, in a plow supported by a wheel and adapted for connection to a tractor having draft sensing means for raising and lowering the front end of the plow in response to variations in draft forces acting on the implement, of power transmission means carried by the plow for vertically moving the supporting wheel and an operating connection between said draft sensing means and said power transmission means responsive to the operation of said draft sensing means for actuating said power transmission means to vertically move the supporting wheel.

Another object of the invention is the provision, in a plow having a vertically adjustable supporting wheel and connected to a tractor by a draft responsive hitch means for automatically adjusting the vertical position of the plow, of novel control means interconnecting the draft sensing means and the supporting wheel for automatically adjusting the vertical position of the latter in response to the vertical adjustment of the front end of the plow.

Other objects and advantages of the invention will become clear from the following detailed description when read in conjunction with the accompanying drawings, wherein:

FIG. 1 is a diagrammatic view in side elevation of a portion of a tractor-implement assembly showing diagrammatically the automatic levelling control means of this invention and illustrating the positions of the parts while the plow units are operating under normal draft conditions;

FIG. 2 is a plan view of a portion of the structure shown in FIG. 1;

FIG. 3 is an electrical circuit diagram utilized in controlling the levelling apparatus of this invention;

FIG. 4 is an enlarged detail of a portion of the main implement control mechanism indicated in FIG. 1, and FIGURE 5 is an enlarged detail of a portion of the plow rear furrow wheel shown in FIG. 1, and control mechanism therefor.

In the drawings the numeral 10 designates a tractor having conventional draft sensing equipment incorporated therein of the type described in the patent to Hanssmann 3,239,013, the disclosure of which is made a part of this application. For the purposes of this disclosure it may be understood that the numeral 11 designates a torsion bar connected by means responsive to twisting motion imparted to the torsion bar to actuate conventional hydraulic power lifting mechanism including valve means controlling the flow of fluid under pressure to hydraulic cylinders, such as indicated at 11a, also disclosed in the Hanssmann patent, carried by the tractor and operatively connected to laterally spaced lift arms 12, one of which is shown in FIG. 1 forming part of a tractor hitch structure 13 of the three-point type, including lift links 14 connecting arms 12 to laterally spaced lower links 15, and an upper link 16 pivotally connected in well known manner to the tractor. Vertical movement of arms 12 serves to raise and lower the hitch structure 13.

The implement described herein is a multi-bottom moldboard plow of the semi-mounted type, having a conventional supporting frame structure 17 including a diagonal beam 18 upon which plow units 19 are mounted at longitudinally spaced locations.

A vertically extending plate 20 secured to the front end of frame 17 has affixed thereto a vertically extending bearing housing 21 in which is rotatably received a spindle 22, to the upper end of which is secured a lug 23 carrying a stud 24 serving as the pivot pin for the rear end of upper hitch link 16. A U-shaped socket 25 is affixed to the lower end of spindle 22 and has mounted therein a conventional transverse three-point hitch draft bar 26 to each end of which is secured a lug 27 for pivotal connection thereto of the rear ends of lower hitch links 15. The implement frame 17 is capable of lateral swinging movement about the axis of spindle 22 relative to the tractor. Likewise, by virtue of the connection of the tractor hitch structure 13 to the implement, the front end of the latter is raised and lowered with the raising and lowering of the hitch structure 13.

As pointed out before, the tractor is provided with well known valve means, not shown, for controlling the flow of fluid under pressure to conventional hydraulic cylinders, also not shown, for vertically swinging lift arms 12, and controlled either manually by the tractor operator or automatically through the draft sensing means generally designated by the numeral 28, of which the torsion bar 11 forms a part. The latter has secured thereto crank 29 pivotally receiving the forward end of one of the lower links 15. Excess draft forces acting on the earthworking units 19 rotate one end of the torsion bar 11 about its axis to transmit motion, in a manner such as that described in the Hanssmann patent referred to hereinbefore, to the valve mechanism of the hydraulic system on the tractor, actuating the hydraulic cylinders to raise lift arms 12 of hitch structure 13, and therefore lifting the front end of the plow. The plow units tilt upwardly and rise to a shallower operating depth until the draft forces acting on the implement return to normal, whereupon the direction of rotation of the end of torsion bar 11 is reversed. Lever 29 swings forwardly upon relaxation of the draft forces and again actuates the hydraulic system to lower the lift arms 12 until the normal operating depth of the earthworking units is again reached.

Such draft sensing operations as the sole automatic control for an elongated semi-mounted implement of the type shown, because of the tendency of the front end of the plow to ride out of the ground instead of merely seeking a shallower depth until the abnormal draft conditions have passed causes objectionable variations in cutting depth between the front and rear plow bottoms. In order to successfully utilize the draft sensing feature of tractors, it is necessary that a plow of this type respond adequately to abnormal draft conditions by remaining substantially level from front to rear as it rises to shallower or sinks to greater operating depth in response to abnormal draft conditions.

In order to transport the plow, it should be noted that the hitch structure 13 is raised to elevate the front end of the plow, and at the same time a supporting wheel assembly for the rear end of the plow, in the form of a rear furrow wheel unit 30 which is actuated to effect the raising and lowering of the rear end of the plow frame. This is accomplished by the provision of a second or auxiliary power transmission device in the form of a hydraulic cylinder 31 mounted on the rear end of the plow frame and connected at its other end to an arm 32 affixed to the upper of a pair of vertically spaced parallel links 33 and 34 pivotally connected at their forward ends to an upright 35 secured to the rear end of an extension 36 on plow beam 18. The rear ends of the links are pivotally connected to a sleeve 37 in which is pivotally mounted a vertical spindle 38 having a furrow wheel 39 at its lower end. In a well known manner the manually operated remote hydraulic valve mechanism of the tractor controls the flow of fluid to and from cylinder 31 to extend and retract piston 40 to vertically swing links 33 and 34 to raise and lower the rear end of the frame and to lock the fluid in the cylinder to hold the rear end of the plow frame in its selected position relative to wheel 39.

During operation of the implement under normal draft conditions the position of the earthworking units and of the furrow wheel 39 are as indicated in solid lines in FIG. 1. Gauge means are provided to run on the land above the furrow formed by the earthworking units in the form of a wheel 41 adjustably mounted on the frame by an attaching bar 42 having a plurality of apertures 43 therein for connection of the bar in any well known manner to the plow frame.

In order to automatically raise the rear end of the plow frame when the forward end rises in response to operation of the draft sensing means 28, automatically operated levelling control means is provided which includes a mechanism for transmitting the motion of lever 29, not only to the hydraulic lifting apparatus of the tractor, as described in the Hanssmann patent referred to hereinbefore, but also to the cylinder 31. The lower end of a strap 44 is secured to a lug 45 affixed to torsion bar 11 and to the upper end of the strap is secured a cam plate 46 forming the actuating means for a pair of main single pole double throw electrical switch means 47 and 48 anchored to a plate 49 attached to the tractor body, switches 47 and 48 forming part of the electrical circuit as shown in FIG. 3.

Auxiliary hydraulic valve means 50 is mounted on an angle bar 51 secured to the plow backbone or beam 18 and is supplied with fluid under pressure from the same source on the tractor that supplies the cylinder for raising and lowering lift arms 12, fluid passing to and from the valve means through hose lines 52 and 53. Valve means 50 is of any well known construction adapted to feed hydraulic fluid to operating cylinder 31. Fluid is fed to cylinder 31 through hose lines 54 and 55 by operation of a conventional double solenoid 56 comprising a first solenoid 57 for lowering the rear end of the frame relative to the furrow wheel assembly and a second solenoid 58 for raising the rear end of the frame relative to the rear wheel assembly, the two solenoids being interconnected and mounted on the plow frame.

The auxiliary valve means 50 comprises a valve structure of conventional form including a housing 59 in which is slidable a valve stem 60 the movement of which from one position to another controls the flow of fluid to and from cylinder 31 which extends and retracts the piston rod 40 therein. Valve stem 60 is connected to the solenoids through a rod 61, 59a, the latter being slidable in the solenoids in opposite directions in response to actuation of the solenoids to extend and retract valve stem 60.

When excess draft load is encountered by the earthworking units 19 the draft responsive means 28 including torsion bar 11, lever arm 29 and strap 44 revolve clockwise from the normal operating position of the implement shown in FIG. 1. In FIG. 4 a central cam lobe 62 centrally disposed on the upper edge of plate 46 is shown engaging an actuator 63 for switch member 47. Current is supplied from a source 64, preferably provided by the tractor and passes through a manually closable switch 65. With switch 47 closed current goes to solenoid 57 which acts through rod 59a and moves valve stem 60 in a direction to supply fluid under pressure to the head end of cylinder 31 to extend piston rod 40 therein, swinging the forward ends of links 33 and 34 upwardly about their pivots on sleeve 37 at the same time that the draft responsive means 28 actuates the lifting mechanism for arms 12 to raise the hitch structure 13 and the front end of the plow.

Swinging the rear end of the plow frame upwardly while raising the hitch structure 13 causes the entire plow to remain substantially level or horizontal as it rises to a shallower operating position, or to transport above the ground. With the hitch structure 13 under draft control, upward movement of the plow due to abnormal draft load reduces the draft to a normal level, causing the main switch cam plate 46 to swing counterclockwise and open switch 47 controlling solenoid 57.

Rear supporting wheel unit 30 must now be restored to its initial relationship with the rear plow unit 19. A bracket 66 secured to sleeve member 37 has mounted thereon a pair of single pole single throw switches 67 and 68. As shown in the circuit diagram, a circuit cannot be completed through switch 67 until main switch 47 is reopened, at which time current can pass through switch 67 to solenoid 58 to reverse valve means 50 and supply fluid to the opposite end of cylinder 31 to retract it. Closing of switch 67 is accomplished by the provision of a cam lobe 69 mounted on a cam plate 70 affixed to upper parallel link 33, and engageable with an actuator 71 for switch 67. Piston rod 40 continues to retract in cylinder 31 until cam lobe 69 moves out of engagement with actuator 71 to again open switch 67. Valve means 50 recenters and the furrow wheel unit 30 is in its normal relationship to the rear plow unit 19.

A reduction in draft load, conversely, causes draft sensing unit 28 to rotate counterclockwise from a normal operating position causing a cam lobe 72 on cam plate 46 to engage an actuator 73 for switch 48 to close it. This actuates solenoid 58 to move valve 50 to retract cylinder 31 while also acting upon the tractor power lift mechanism to lower the hitch structure 13 causing the entire plow to remain substantially level or horizontal as it lowers itself to a deeper operating position. With the hitch structure 13 under draft control, downward movement of the plow due to a reduction in draft load, increases the draft load to a normal level, causing the main switch cam plate 46 to swing clockwise and open switch 48 controlling solenoid 58. The rear supporting unit 30 must now be restored to its initial relationship with the rear plow unit 19. With switch 48 open the lowering of the rear end of the plow by retracting cylinder 31 causes a cam lobe 74 on plates 70 to engage an actuator 75 for switch 68, closing it and actuating the lifting solenoid 57 to return the wheel unit 30 to its normal relation with the plow units.

In raising the implement to a transport position the tractor operator actuates the power lifting mechanism of the tractor to raise hitch structure 13. This lowers the draft load, causing the draft sensing mechanism 28 to rotate counterclockwise and momentarily close switch 48, which energizes solenoid 58 to retract cylinder 31. This retraction closes switch 68, energizing the lifting solenoid 57 upon reopening of switch 48. Upon continued lifting the draft load continues to decrease and a cam lobe 76 on cam plate 46 closes switch 47, extending cylinder 31 until cam lobe 76 moves away from switch 47. By this tme cam lobe 69 on cam plate 70 has moved outside of actuator 71 of switch 67 to open it and maintain the wheel in transport position.

It is believed that the construction and operation of the novel automatic implement control means of this invention will be clearly understood from the foregoing description.

What is claimed is:

1. In an implement attachment for a tractor having vertically movable hitch means for connecting the forward end of the implement thereto, a source of electric current, a source of fluid under pressure and a first hydraulic power transmission device operatively connected to the hitch means for raising and lowering said hitch means, movable ground support means mounted on the implement for movement relative thereto to raise and lower the rear end of the implement, a second hydraulic power transmission device on the implement operatively connected to movable ground support means for moving said support means, valve means on the tractor accepting fluid from said source and regulating the distribution of fluid to said first and second power transmission devices, a movable draft responsive member mounted on the tractor operatively connected to said hitch means and to said valve means and movable in response to draft forces acting on the implement to open said valve means to direct fluid under pressure to and actuate said first power transmission device to vertically move the forward end of the implement, and separate control means connected to said source of electric current and operatively connected to said valve means and to said movable draft responsive member and responsive to movement of said draft responsive member for controlling the flow of fluid to said second hydraulic power transmission device.

2. The invention set forth in claim 1, wherein said control means includes electric switch means mounted on the tractor and connected to said source of electric current and to a switch actuating member mounted on said movable draft responsive member and responsive to movement thereof for actuating said switch means, said electric switch means being operatively connected to said valve means for controlling the flow of fluid to said second hydraulic power transmission device.

3. The invention set forth in claim 2, wherein said valve means includes main valve means on the tractor and auxiliary valve means on the implement interposed between said main valve means and said second hydraulic power transmission means, and said electric switch means on the tractor is operatively connected tos aid auxiliary valve means to control the operation of said second power transmission device.

4. The invention set forth in claim 3, wherein solenoid means mounted on the implement is operatively connected to said auxiliary valve means and to said electric switch means on the tractor said auxiliary valve means being energized by said electric switch means in response to movement of said draft responsive member to control the flow of fluid from said auxiliary valve means to said second hydraulic power transmission device.

5. The invention set forth in claim 4, wherein auxiliary switch means is mounted on the implement and is operatively connected to said electric switch means on the tractor and to said movable ground support means and wherein said support means to be moved is a supporting wheel mounted on the implement frame for vertical movement relative thereto to raise the rear end of the implement upon movement of said draft responsive member in one direction in response to abnormal draft forces acting upon the implement, said auxiliary switch means being actuated upon movement of said draft responsive member in the other direction in response to return of said draft forces to normal to operate said auxiliary valve means and said second power transmission device to move said wheel relative to the frame to lower the rear end of the implement.

6. The invention set forth in claim 5, wherein said electric switch means on the tractor is the primary switch means closable by movement of said draft responsive member in said one direction to effect the raising of the rear end of the implement when the forward end thereof is raised in response to increased draft forces acting on the implement, and said auxiliary switch means is closable by the raising of the rear end of the implement, said primary switch means being operable by movement of said draft responsive member in the other direction in response to decreased draft forces acting on the implement, and the closing of said auxiliary switch means being automatically effective upon the opening of said primary switch means to actuate said second hydraulic power transmission device to again lower the rear end of the implement.

7. The invention set forth in claim 4, wherein said second hydraulic power transmission device is a double acting hydraulic cylinder operatively connected to said supporting wheel and wherein the fluid in said cylinder is under pressure in both extension and retraction strokes thereof, and wherein said solenoid means is a double solenoid operatively connected to said auxiliary valve means to direct fluid to either end of said cylinder for raising and lowering the rear end of the implement.

8. The invention set forth in claim 2, wherein said switch means on the tractor includes a switch having a contact member biased to the open position of the switch and a cam member mounted on said movable draft responsive member and movable therewith to and from a position in switch-closing relation to said contact member.

9. In a semi-mounted plow attachment for a tractor having hitch means connected to the plow, a source of electric current, and a source of fluid under pressure carried by the tractor, hydraulically operated lift means connected to the hitch means for raising and lowering the forward end of the plow and draft sensitive means in the hitch means movable in response to abnormal draft forces acting on the plow and operatively connected to said hydraulically operated lift means controlling the flow of fluid to said lift means, a supporting wheel mounted on the rear portion of the plow for vertical movement relative thereto, a hydraulic cylinder on the plow operatively connected to said supporting wheel to raise the rear end of the plow in response to said raising of the forward end of the plow, valve means mounted on the plow and interconnected to said source of fluid under pressure and having a connection to said hydraulic cylinder to operate said hydraulic cylinder, electrically operated means mounted on the plow to actuate said valve means, and electric switch means connected to said source of electric current and operatively connecting said electrically operated means and said draft sensitive means and operable in response to said movement of said draft sensing means for controlling electrically operated means to actuate said hydraulic cylinder to raise the rear end of the plow.

References Cited

UNITED STATES PATENTS

| 3,061,020 | 10/1962 | Mannheim | 172—285 |
| 2,974,733 | 3/1961 | Fletcher | 172—7 |
| 3,374,842 | 3/1968 | Smith | 172—7 |

ROBERT E. PULFREY, Primary Examiner

S. C. PELLEGRINO, Assistant Examiner

U.S. Cl. X.R.

172—417; 280—414.5